(12) United States Patent
Knudsen et al.

(10) Patent No.: US 11,888,380 B2
(45) Date of Patent: Jan. 30, 2024

(54) LINEAR ACTUATOR

(71) Applicant: LINAK A/S, Nordborg (DK)

(72) Inventors: Martin Kahr Knudsen, Sydals (DK); Henrik Skovby, Sydals (DK); René Sørensen, Gråsten (DK)

(73) Assignee: Linak A/S, Nordborg (DK)

( * ) Notice: Subject to any disclaimer, the term of this patent is extended or adjusted under 35 U.S.C. 154(b) by 310 days.

(21) Appl. No.: 16/626,422

(22) PCT Filed: Jun. 28, 2018

(86) PCT No.: PCT/DK2018/000026
§ 371 (c)(1),
(2) Date: Dec. 24, 2019

(87) PCT Pub. No.: WO2019/001650
PCT Pub. Date: Jan. 3, 2019

(65) Prior Publication Data
US 2020/0136465 A1    Apr. 30, 2020

(30) Foreign Application Priority Data
Jun. 28, 2017 (DK) .......................... PA 2017 00383

(51) Int. Cl.
*H05K 5/03* (2006.01)
*H02K 7/06* (2006.01)
*H02K 11/20* (2016.01)
(Continued)

(52) U.S. Cl.
CPC ............... *H02K 7/06* (2013.01); *H02K 5/225* (2013.01); *H02K 11/20* (2016.01); *H02K 11/30* (2016.01);
(Continued)

(58) Field of Classification Search
CPC ........ H02K 11/30; H02K 5/225; H02K 11/20; H02K 7/06; F16H 2025/2084; F16H 2025/209
(Continued)

(56) References Cited

U.S. PATENT DOCUMENTS

2006/0266146 A1* 11/2006 Waide ................... H02K 11/225
                                                            74/424.92
2007/0107649 A1*  5/2007 Tolbert ................... B63C 9/0011
                                                            114/294
(Continued)

FOREIGN PATENT DOCUMENTS

DE    102004023243 A1   12/2005
GB         636171 A      4/1950
(Continued)

OTHER PUBLICATIONS

Horikawa, Niko, Stage device amchien translation (Year: 1994).*

Primary Examiner — Kawing Chan
Assistant Examiner — Gabriel Agared
(74) Attorney, Agent, or Firm — Dykema Gossett PLLC

(57) ABSTRACT

The present invention relates to a linear actuator comprising a console, an outer tube connected to the console, an electric motor, a transmission, and a spindle in connection with the transmission. The linear actuator comprises a spindle nut on the spindle and an inner tube connected to the spindle nut. The spindle nut and the inner tube are guided inside the outer tube. The linear actuator comprises a control box which is connected to the console by means of a snap connection. The linear actuator further comprises an end stop arrangement having an end switch for each direction of movement of the spindle nut. An object underlying the invention is to provide a simpler connection of the control box to the linear actuator. A further object is to provide a less complex construction of the end stop arrangement of a linear actuator. To this end, the (Continued)

Figure 1:
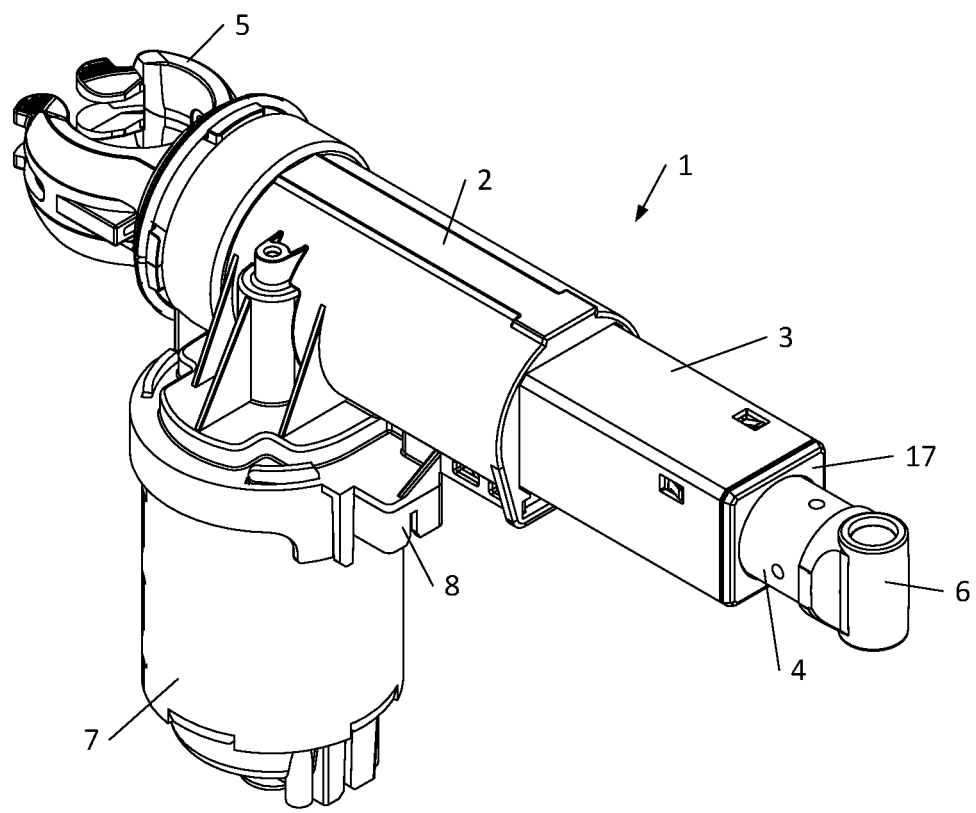

control box is connected to the console by means of a snap connection. Further, the linear actuator comprises a sliding element arranged between the spindle nut and the end switches, and where the sliding element is actuated by the spindle nut.

14 Claims, 7 Drawing Sheets

(51) Int. Cl.
    *H02K 11/30*     (2016.01)
    *H02K 5/22*     (2006.01)
    *F16H 25/20*     (2006.01)

(52) U.S. Cl.
    CPC .................. *F16H 2025/209* (2013.01); *F16H 2025/2084* (2013.01)

(58) Field of Classification Search
    USPC ............................................................ 318/9
    See application file for complete search history.

(56) References Cited

U.S. PATENT DOCUMENTS

| | | | |
|---|---|---|---|
| 2007/0285035 A1* | 12/2007 | Roither | H02K 7/06 318/120 |
| 2010/0178793 A1 | 7/2010 | Wu | |
| 2013/0138057 A1 | 5/2013 | Shirai et al. | |
| 2013/0221171 A1* | 8/2013 | Lorenzen | A47B 9/20 248/188.5 |
| 2017/0241524 A1* | 8/2017 | Olsson | F16H 1/203 |
| 2017/0338714 A1* | 11/2017 | Jorgensen | H02K 7/116 |

FOREIGN PATENT DOCUMENTS

| | | |
|---|---|---|
| WO | 02/29284 A1 | 4/2002 |
| WO | 02/39848 A1 | 5/2002 |
| WO | 2012/08395 A1 | 1/2012 |
| WO | 2016/074678 A1 | 5/2016 |

* cited by examiner

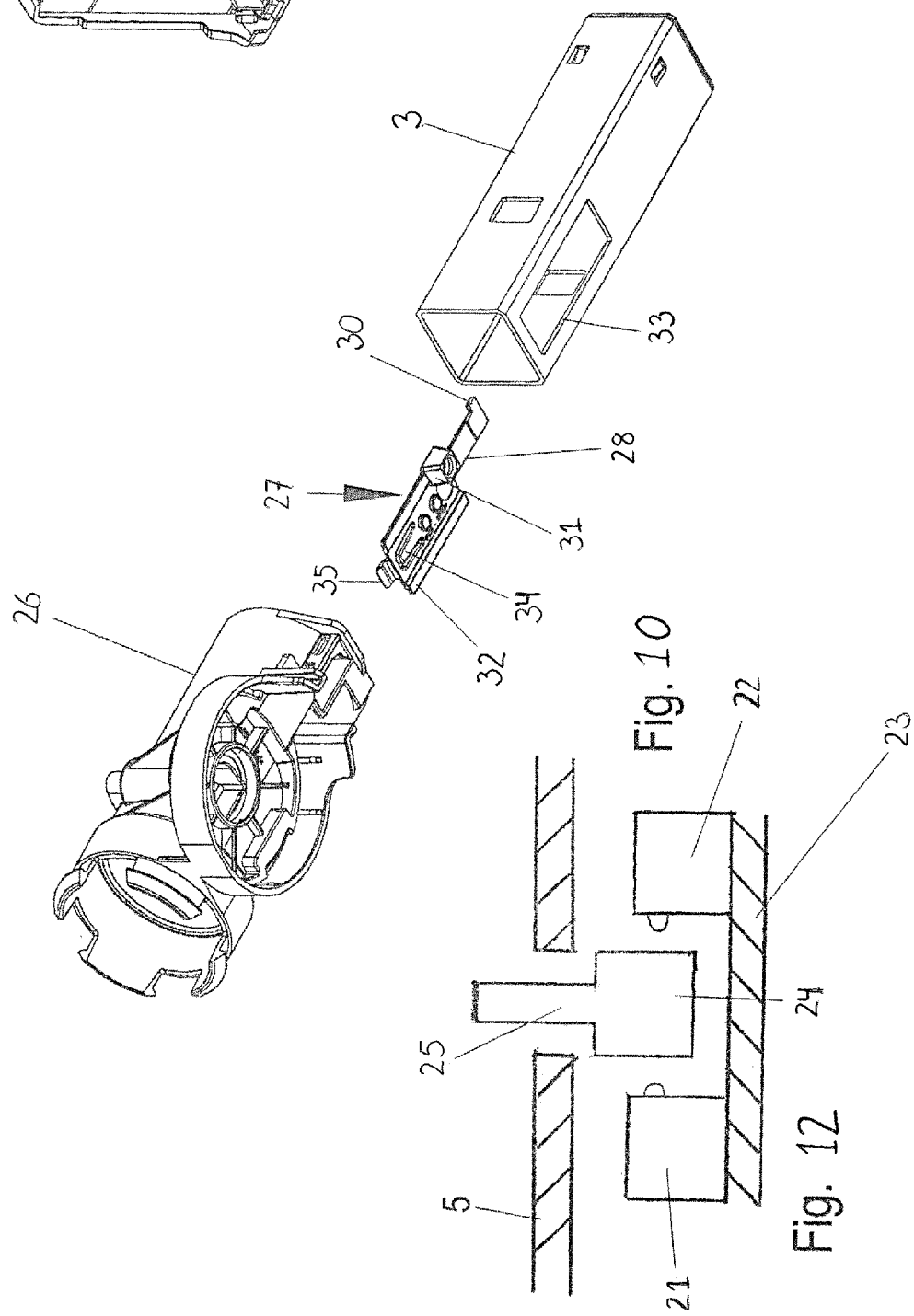

LINEAR ACTUATOR

CROSS-REFERENCE TO RELATED APPLICATIONS

This application is a national stage filing based upon international application no. PCT/DK2018/000026, filed 28 Jun. 2018 (the '026 application), and published in English on 3 Jan. 2019 under international publication no. WO 2019/001650 A1, which claims priority to Denmark (DK) patent application no. PA 2017 00383, filed 28 Jun. 2017 (the '383 application). The '026 application and the '383 application are both hereby incorporated by reference as though fully set forth herein.

The present invention relates to a linear actuator comprising a console, an outer tube connected to the console, an electric motor, a transmission, and a spindle connected to the electric motor via the transmission. The linear actuator further comprises a spindle nut on the spindle and an inner tube connected to the spindle nut. The spindle nut and the inner tube is guided inside the outer tube and moved along the longitudinal axis of the spindle and thereby in or out of the outer tube depending on the direction of rotation of the electric motor. The linear actuator comprises a control box which is connected to the console by means of a snap connection. The linear actuator further comprises an end stop arrangement having an end switch for each direction of movement of the spindle nut.

In a traditional linear actuator system comprising at least one linear actuator, a controller arranged in a control box, an operating unit and a power supply, these elements are connected by wire in a distributed system. To limit the wiring, it has been common to connect the control box to the linear actuator. However, this has e.g. been done by using brackets arranged on the linear actuator, which would act as an adaptor and thus enable the connection of the control box. For some linear actuators, the brackets have even been supplemented with e.g. a clip to prevent the control box from falling off the linear actuator. Examples of such prior art linear actuators can e.g. be found in US2010 178793 A1 and WO2016 074678 A1.

When the spindle nut, during operation, has reached an end position of the stroke length, further operation of the motor in the same direction could be dangerous. In extreme cases such a further movement of the driven element could destroy the linear actuator. To avoid damages, an end stop arrangement is provided. When the spindle nut and thereby the inner tube reaches an end position, the end switch is actuated, which stops further operation of the electric motor.

In a prior art linear actuator, the end switch arrangement comprises a first end switch arranged at a first end of an outer tube and a second end switch arranged at a second end of an outer tube. Both end switches are mounted on a printed circuit board. The printed circuit board therefore requires a considerable length and takes up much space inside the outer tube, see e.g. WO02/292284 A1 to LINAK A/S. As shown in WO2012/083951 A1 to LINAK A/S, it is also common to have the end switch arrangement integrated in a housing or cabinet of the linear actuator. Both such constructions are complex and therefore costly to assemble.

An object underlying the invention is to provide a simpler connection of the control box to the linear actuator. A further object is to provide a less complex construction of the end stop arrangement of a linear actuator.

This object is solved with a linear actuator according to the preamble of claim 1, where the control box is connected to the console by means of a snap connection. In this way, it is very easy to provide the linear actuator with a control box. Depending on specified features of a particular linear actuator, it can be configured with a specific or tailored control box.

In an embodiment of the invention, the control box comprises a hook, and the console comprises a counterpart to the hook, and where the hook and the counterpart to the hook constitute the snap connection. The control box can hereby be connected to the remaining parts of the linear actuator by a single and simple operation.

In a further embodiment, the hook of the control box is resilient.

In an embodiment of the invention, the counterpart to the hook is an eye in the front end of the console.

In an embodiment of the invention, the snap connection is releasable. Hereby, the control box can be disengaged and engaged again without damaging the snap connection In an embodiment, the linear actuator comprises a sliding element arranged between the spindle nut and the end switches, and where the sliding element is actuated by the spindle nut and converts a maximum stroke length of the spindle nut into a smaller stroke length.

In such a linear actuator, the printed circuit board for mounting the end switches can be much smaller. It is no longer necessary for the printed circuit board for the end switches to have the same length as the stroke of the driven element.

In an embodiment of the invention, the sliding element is arranged inside the console.

In an embodiment of the invention, the sliding element is moved by the spindle nut in a predetermined first end section of the stroke length in a first direction and moved in a predetermined second end section of the stroke length in a second direction opposite to the first direction. The sliding element is hereby not moved over a major part of the movement of the spindle nut. Only when the spindle nut reaches an end of its stroke length, it moves the sliding element and activates the end stop switch, which stops the motor. The spindle nut can afterwards only be moved in a reverse direction.

In an embodiment of the invention, the linear actuator comprises a control box connected to the console where the end stop switches are arranged in the control box. In this way, the mechanical part of the linear actuator and the electrical part of the actuator, in particular the control part, can be separated. Further, different types of end stop switches can be used depending on the required specification of the linear actuator without having to change the linear actuator or use a different type of actuator.

In an embodiment of the invention, the sliding element comprises a pin protruding to an outside of the console. Although the sliding element is positioned inside the console, the pin can activate the end switches which are arranged outside the console.

In an embodiment of the invention, the actuation element is arranged inside the outer tube and a slider is arranged outside of the outer tube. The pin is arranged on the slider and the slider is connected to the actuation element through an opening in the outer tube. The slider can have a width perpendicular to its direction of movement which is larger than a corresponding width of the opening in the outer tube. In this way, the slider can be kept on the outside of the outer tube although, for example, the spindle nut can move the actuation element.

In an embodiment of the invention, the actuation element comprises a first stop and second stop, and the spindle nut is arranged between the first stop and the second stop.

In an embodiment of the invention, the first stop is arranged on a flexible tongue. This enables the spindle unit to be inserted through the rear end of the console, in that the first stop, via the flexible tongue, can be deflected in an outwards direction to allow the spindle nut to pass the first stop. This facilitates the assembly of the linear actuator without damaging the spindle nut or the first stop.

In an embodiment of the invention, the actuation element continues on both sides of the slider inside the outer tube. The position of the actuation element relative to the spindle can be fixed in this way.

Figure 2:
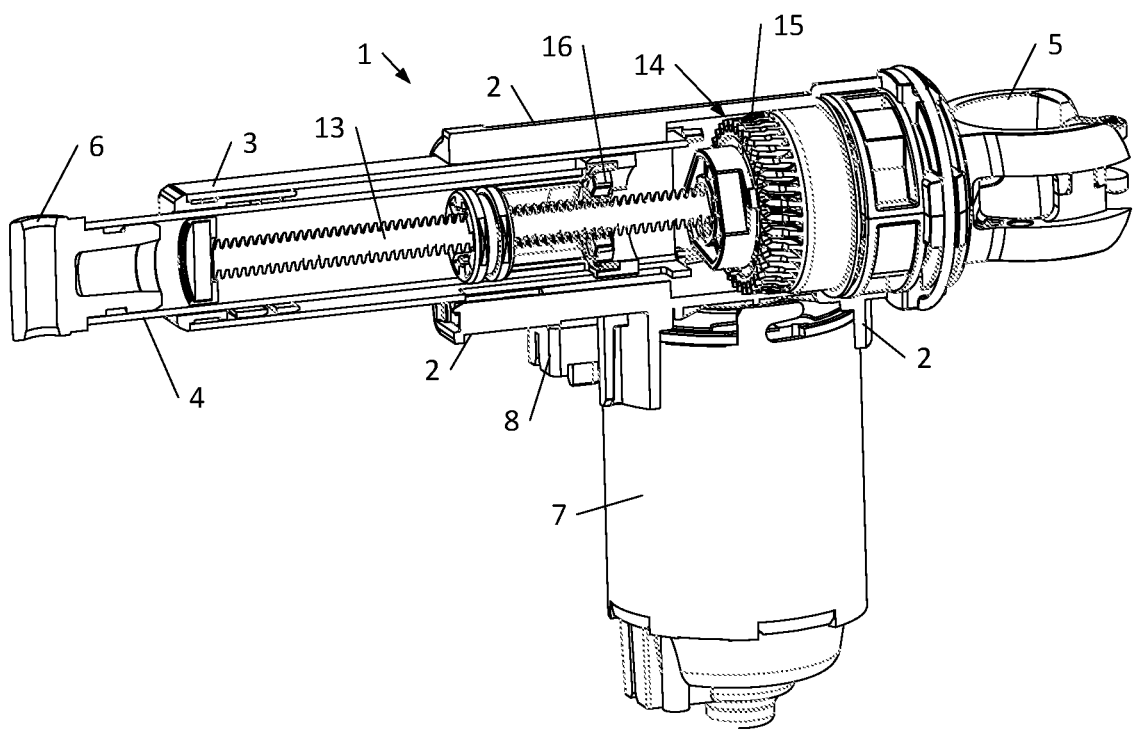
Figure 3:
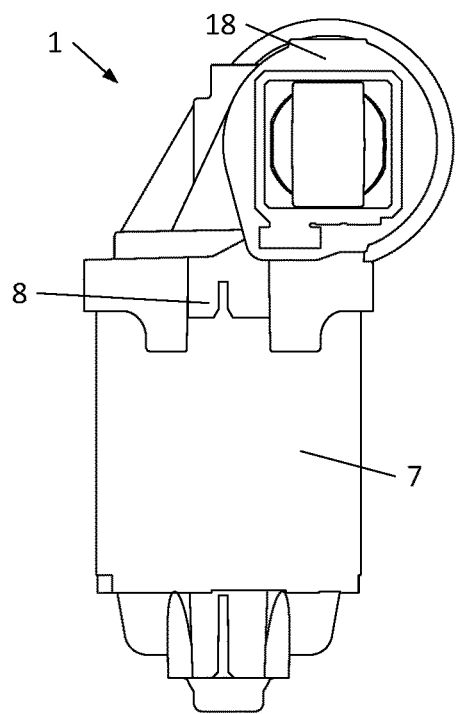
Figure 4:
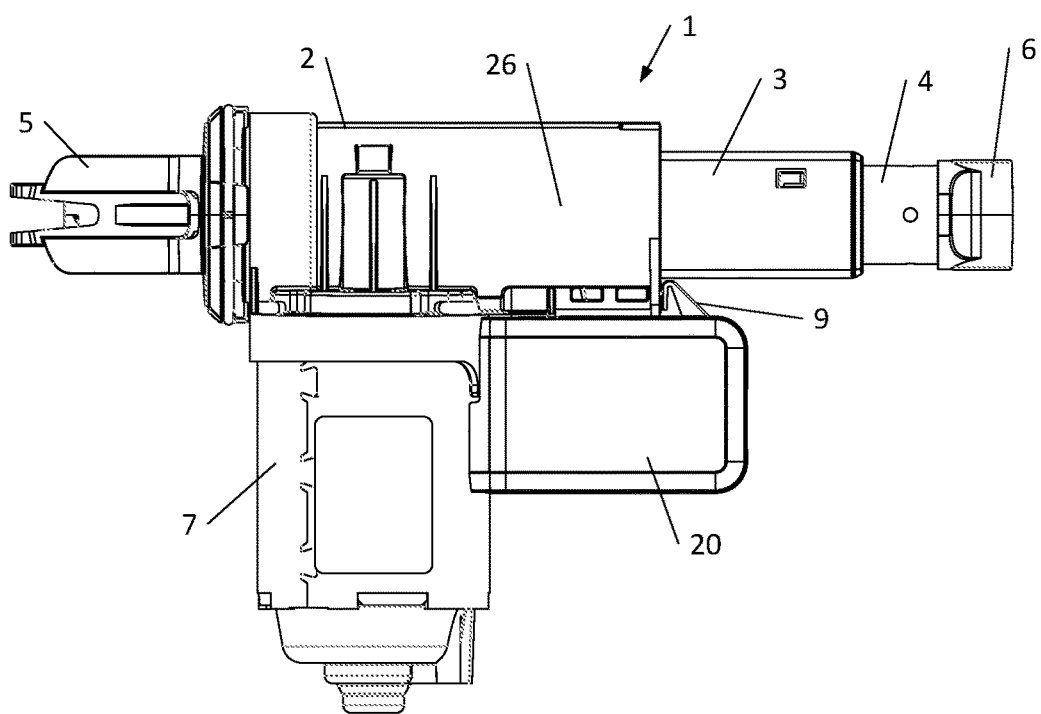
Figure 5:
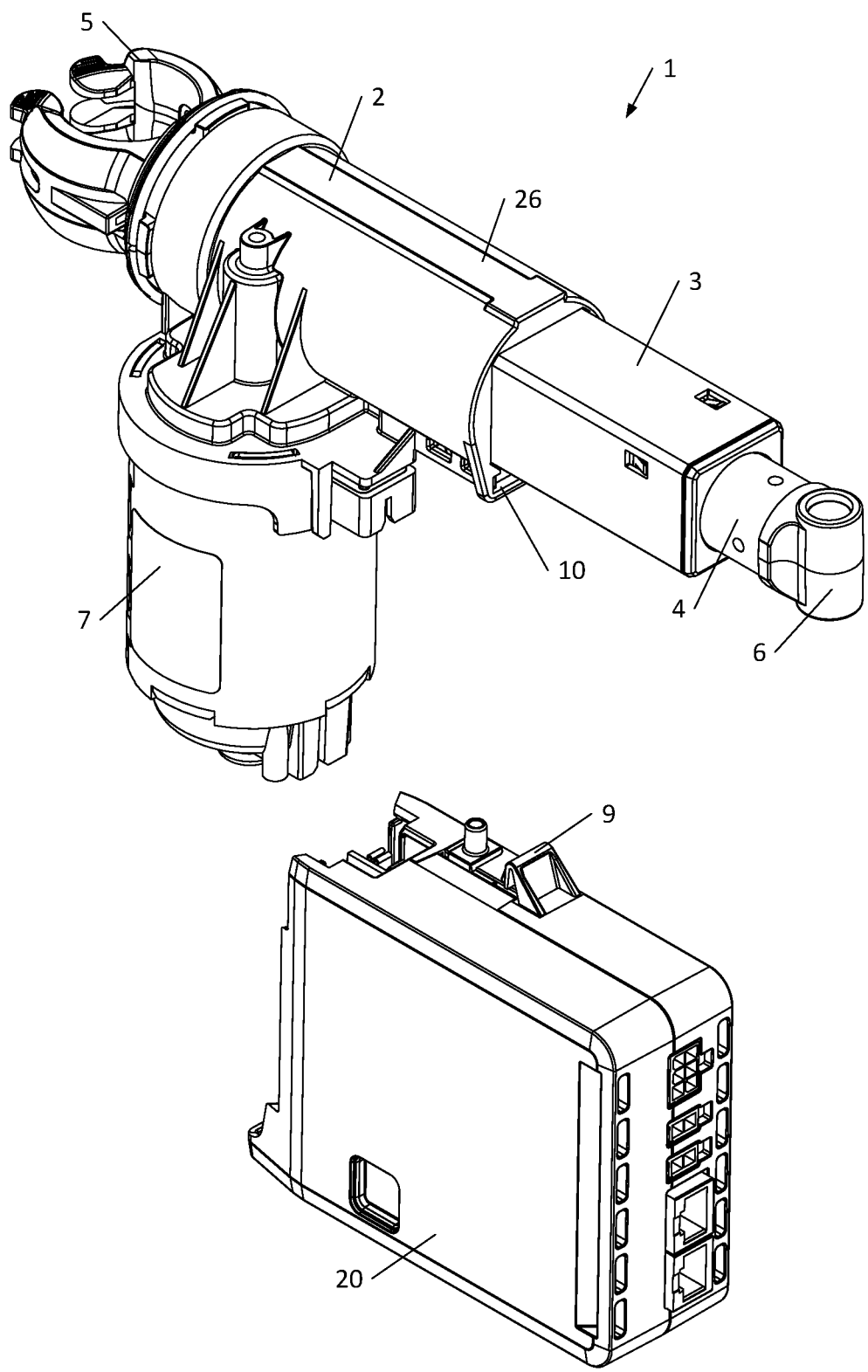
Figure 6:
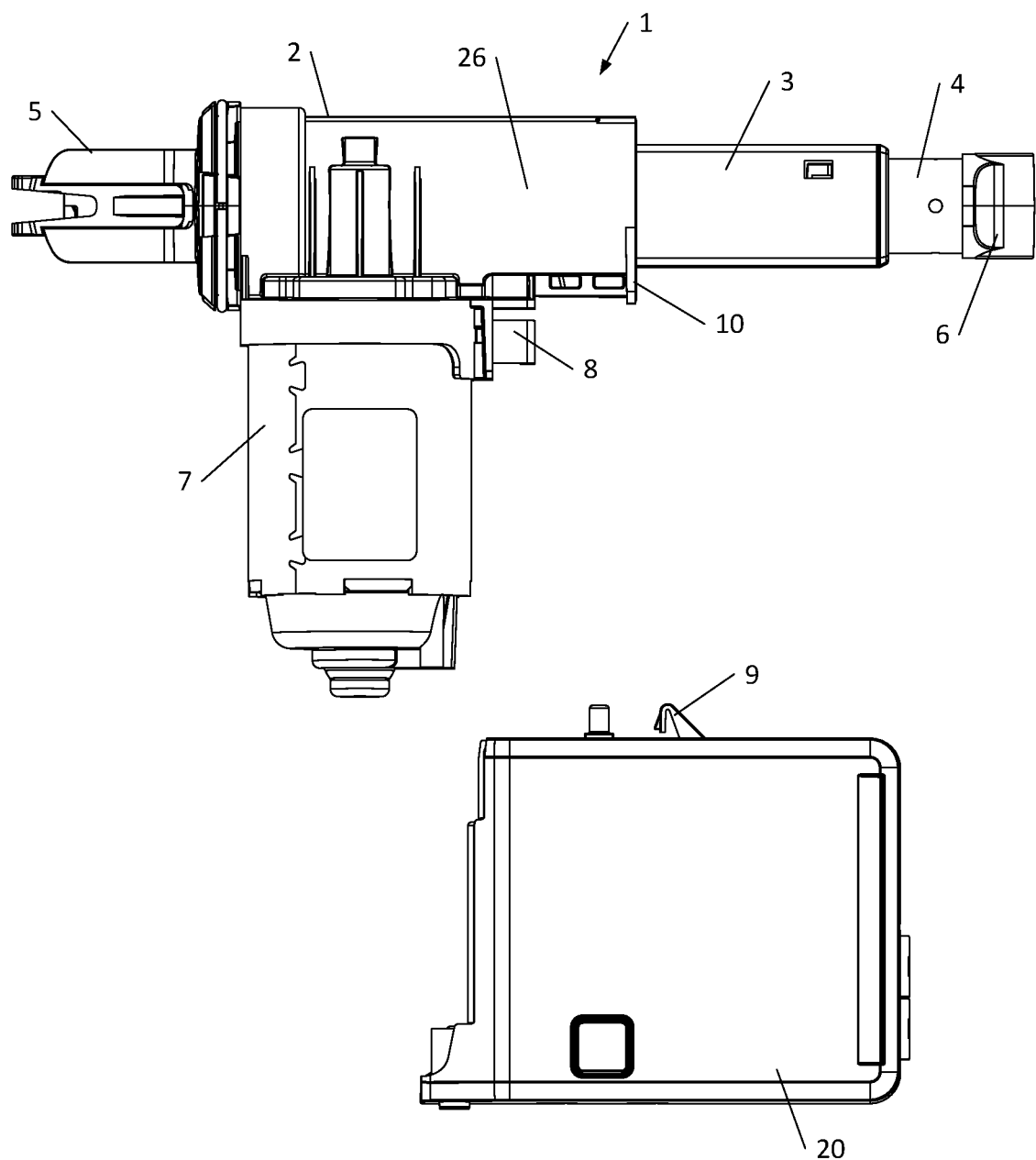
Figure 7:
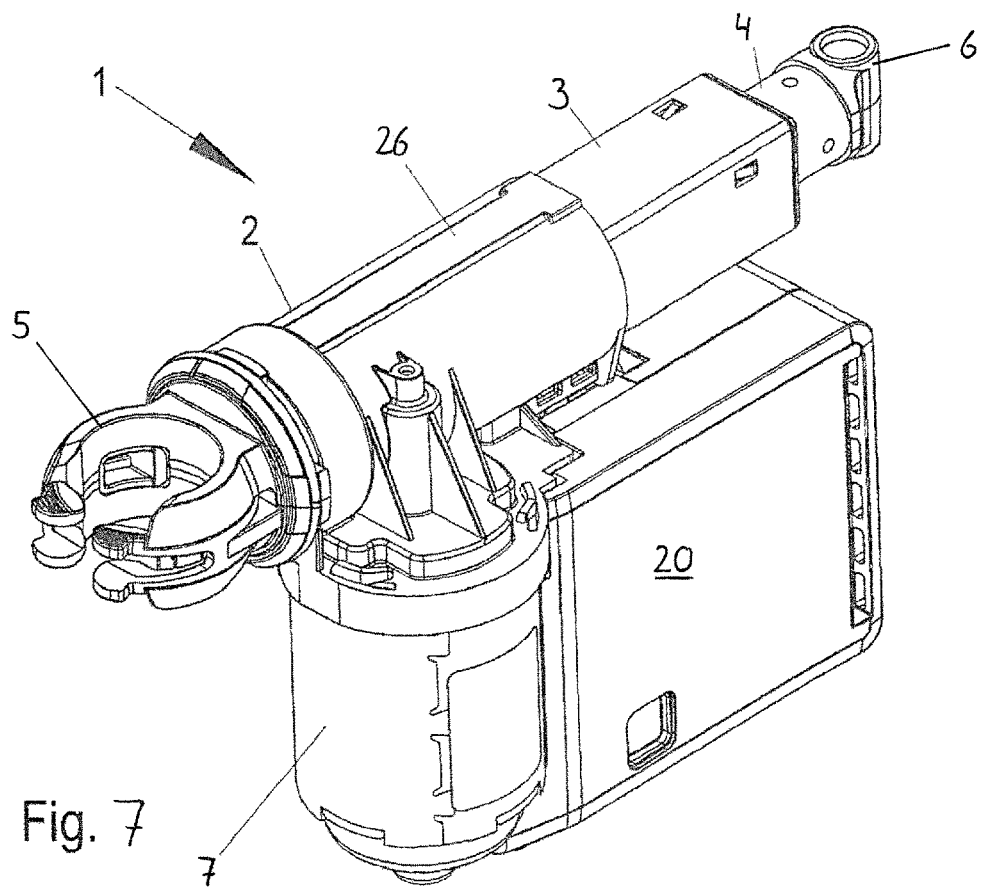
Figure 8:
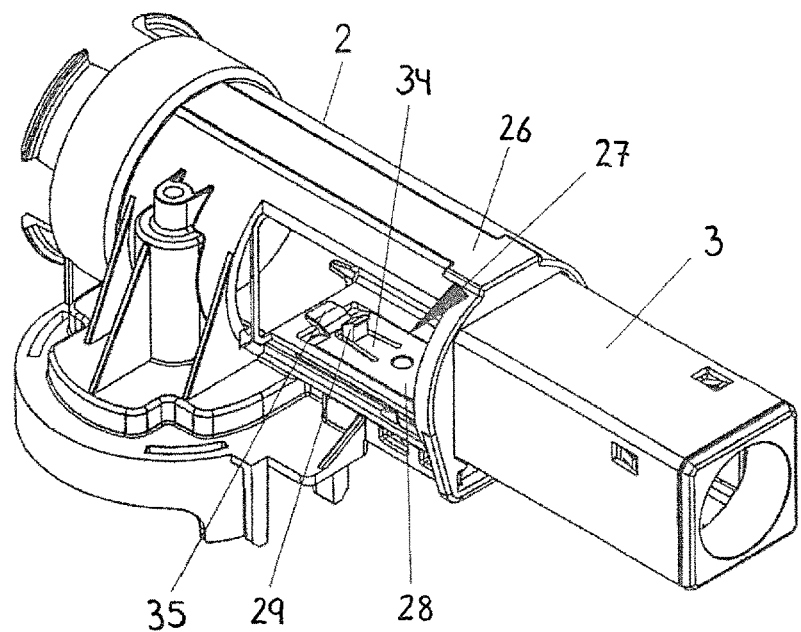
Figure 9:
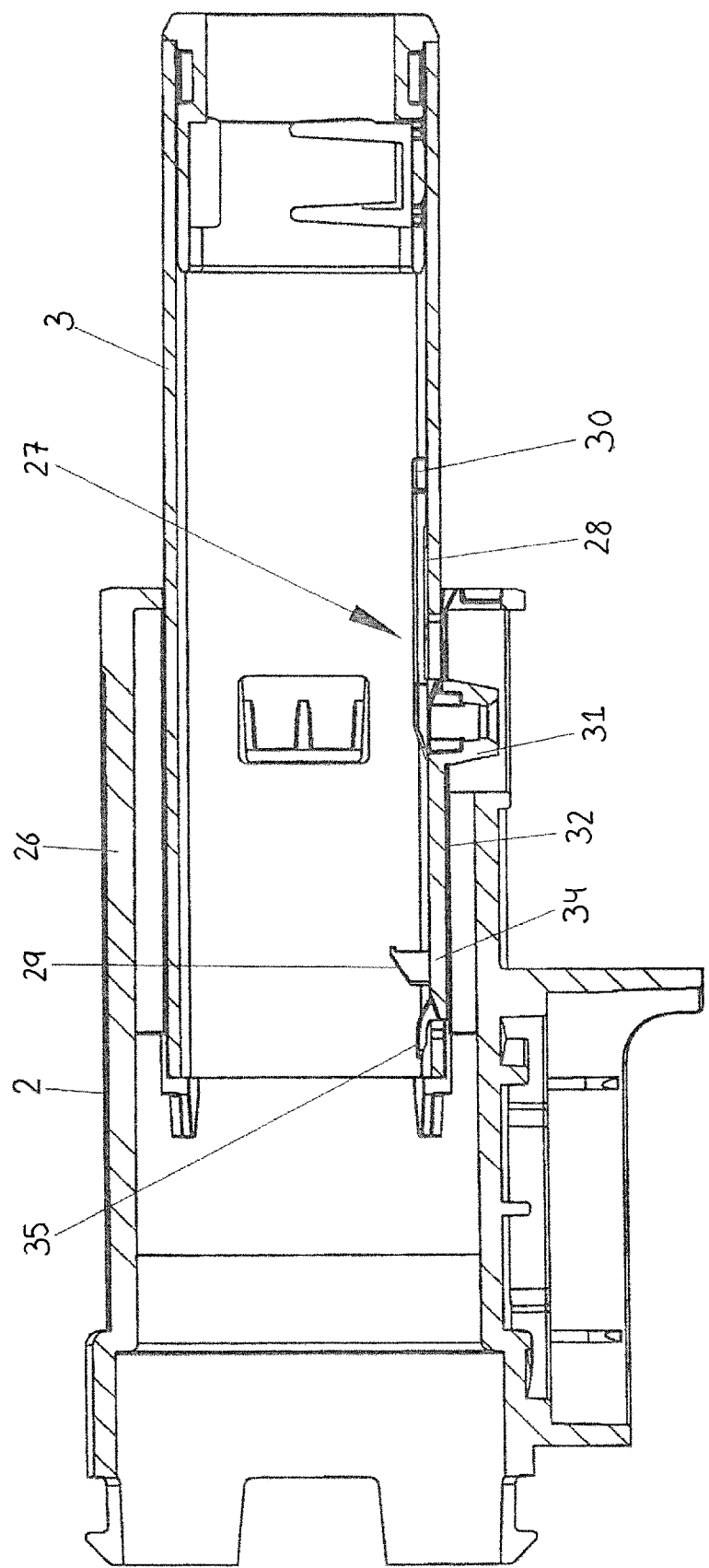

An embodiment of the invention will now be described in more detail with reference to the drawings, wherein:

FIG. 1 shows a perspective view of a linear actuator,

FIG. 2 shows a perspective view of a linear actuator with a longitudinal partial section, FIG. 3 shows a front view of a linear actuator, FIG. 4 is a perspective view of a linear actuator with a small control box, FIG. 5 is an exploded perspective view of a linear actuator with a larger control box not yet connected to the console, FIG. 6 is an exploded side view of the linear actuator of FIG. 5 with the larger control box not yet connected to the console, FIG. 7 is a perspective view of the linear actuator of FIGS. 5 and 6 with the larger control box connected to the console, FIG. 8 is a perspective view of the console, the outer tube and the sliding element, where a part of the console has been cut away, FIG. 9 is a longitudinal section through the parts of the linear actuator shown in FIG. 8, FIG. 10 is a perspective exploded view of parts of the linear actuator shown in FIGS. 8 and 9, FIG. 11 is a perspective view of a control box, and FIG. 12 is a schematic illustration of the end switches.

FIG. 1 shows a perspective view of a linear actuator 1 comprising a console 2, an outer tube 3 and an inner tube 4 guided in this. For mounting the linear actuator, a rear end is equipped with a rear mounting 5 and the front end of the inner tube 4 is equipped with a front mounting 6. As it appears from both FIG. 1 and FIG. 2, the linear actuator 1 comprises an electric motor 7, typically a reversible electric motor, which can be either a DC or AC motor for low voltage or mains voltage. The electric motor 7 is mounted to the bottom of the console 2 and the rear mounting 5 is mounted to the rear end of the console 2.

The linear actuator 1 comprises a socket 8 for connecting the linear actuator 1 to a power supply or an electric controller.

The outer tube 3 comprises a rectangular section, in particular a square section, i.e. the outer tube 3 comprises four walls The linear actuator 1 further comprises a spindle 13, driven by the electric motor 7 through a transmission 14, which is a worm gear, where an extension of the shaft of the electric motor 7 is designed as a worm (not shown) in engagement with a worm wheel 15, mounted on the spindle 13.

A spindle nut 16 with internal threads engage with the external threads of the spindle 13. The spindle nut 16 is guided inside the outer tube 3 and is secured against rotation.

The end part of the spindle nut 16 facing the front mounting is adapted for receiving the inner tube 4. More specifically, the rear end of the inner tube 4 can be secured to the spindle nut 16 via corresponding threads on both parts, or the spindle nut 16 can have a projecting edge or shoulder on which the inner tube can be accommodated. Activation of the electric motor 7 will, via the transmission 14, cause the spindle 13 to rotate, whereby the spindle nut 16 and inner tube 4 will travel along the longitudinal axis of the spindle 13 in a direction depending on the direction of rotation of the electric motor 7.

The front end of the outer tube 3 comprises a bushing 17 for guiding the inner tube 4. The bushing 17 can be designed with a seal to prevent ingress of dust and moisture between the bushing 17, the outer tube 3 and the inner tube 4, respectively.

The console 2 comprises a front end 18 with an opening 19 which is adapted to the cross section of the outer tube 3. Since the outer tube 3 has a rectangular or square section, the outer tube 3 is fixed against rotation with respect to the console 2. The outer tube 3 is connected to the console 2 by means of a snap connection.

FIG. 4 shows a linear actuator 1 onto which a small control box 20 is attached to the console 2 and the electric motor 7. FIGS. 5 and 6 show a linear actuator 1 with a larger control box 20 detached from the console 2 and the electric motor 7. Further, FIG. 7 shows the same linear actuator with the control box 20 attached to the console 2 and the electric motor 7. The control box 20 comprises a resilient hook 9 at a side facing the console 2. When the control box 20 is connected to the electric motor 7, the resilient hook 9 forms a snap connection with a counterpart 10 of the console 2. The counterpart 10 of the snap connection can be formed as an eye in the front side 18 of the console 2. The snap connection can be releasable so that the control box 20 can be disengaged from the console 2. In another embodiment (not shown), the counterpart 10 to the resilient hook 9 can be arranged on the outer tube 3.

The linear actuator comprises an end stop arrangement for deactivating the electric motor 7, when the spindle nut 16 reaches one of its two end positions defined on the spindle 13. These end positions, defining the stroke length of the linear actuator, can be two endpoints anywhere on the spindle 13. This means that the end positions do not have to be the end points of the actual length of the spindle 13. The stroke length can thus be shorter.

The end stop arrangement has a first end switch 21 and a second end switch 22, which are arranged within the control box 20. The two end switches 21,22 are arranged on a common printed circuit board 23 which is much shorter than the maximum stroke of the spindle nut 16 and thus also the inner tube 4. The end switches 21, 22 can be power switches or signal switches.

The end switches 21,22 are activated when the spindle nut 16 reaches one of its end positions. To this end the control box 20 is provided with a switching element 24 having a protrusion 25 protruding out of the control box 20.

A part of the console 2 is constituted by a body 26 in which the outer tube 3 is inserted. The control box 5 can be snapped onto the linear actuator 1 by engaging with the body 26 of the console, the socket 8 and the electric motor 7.

FIGS. 5 to 7 show the body 26 and the outer tube 3 and in addition, parts of a sliding element 27 which is arranged inside the outer tube 3, between the spindle nut 16 and the inner tube 4, and the switching element 24. The part of the sliding element 27 arranged inside the outer tube 3 engages with the spindle nut 16 when it reaches an end position of the stroke length of the linear actuator 1. The sliding element 27 thereby converts a maximum stroke length of the spindle nut 16 into a smaller stroke length. This conversion is provided by the actuation element 28 of the sliding element 27 which is moved by the spindle nut 16. The actuation element 28 comprises a first stop 29 and a second stop 30. A distance between the two stops 29,30 is somewhat smaller than the maximum stroke of the spindle nut 16. It is noted that the length of the sliding element 27 is adapted to the particular stroke length of each linear actuator 1.

When the spindle nut 16 is moved in a direction where the inner tube 4 moves into the console 2, the spindle nut 16 engages with the first stop 29 and upon further movement pushes the first stop 29 and thereby the sliding element 27 in the direction of movement. When the spindle nut 16 moves in the opposite direction where the inner tube 4 moves out of the console 2, it engages with the second stop 30 and pushes the second stop 30 and thereby the sliding element 27 in the same direction. The sliding element 27 is spring loaded. This means that when the sliding element 27 is not engaging the first stop 29 or second stop 30, it will be in a neutral position, i.e. the spring will be in a state of equilibrium. Hence, when the spindle nut 16 is in contact with the first stop 29 and is moved in a direction where the inner tube 4 is moved out of the console 2, the sliding element 27 is moved into a neutral position. From here, the spindle nut 16 will again be able to engage the second stop 30 or the first stop 29. In other words, the sliding element 27 can be moved by the spindle nut 16 in a predetermined first end section of the stroke length in a first direction and moved in a predetermined second end section of the stroke length in a second direction opposite to the first direction.

The sliding element 27 comprises a pin 31 protruding out of an opening 33 in the outer tube 3. The protrusion 25 of the control box 20 can be brought into engagement with the pin 31 when the control box 20 is connected to the console 2, socket 8, and motor 7.

The sliding element 27 comprises a slider 32 which is arranged on the outside of the outer tube 3. The pin 31 is arranged on the slider 32. The slider 32 is connected to the actuation element 28 through an opening 33 in the outer tube 3.

When the outer tube 3 is mounted in the body 26 of the console 2, the slider 32 is arranged between the outer tube 3 and the body 26.

As can be seen, in particular in FIG. 5, the first stop 29 is arranged on a flexible tongue 34. The flexible tongue 34 is arranged in the region of the opening 33 of the outer tube 3. When the outer tube 3 is mounted in the body 26 of the console 2 and the sliding element 27 is in its place, the spindle unit is ready to be inserted into the console 2 from its rear end, i.e. the end where the rear mounting 5 is mounted. Among other things, the spindle unit comprises the spindle 13, the spindle nut 16, a bearing (not shown), and a brake (not shown). When the spindle unit is inserted, the spindle nut 16 must pass the first stop 29 so that it is situated between the first stop 29 and the second stop 30. To this end the first stop 29 can, via the flexible tongue 34, be deflected in an outwards direction to allow the spindle nut 16 to pass the first stop 29.

The actuation element 28 extends on the other side of the first stop 29 with a tongue 35 so that the actuation element 28 is held on the inner side of the outer tube 3. The tongue 35 thus serves to assist in positioning the sliding element 27 correctly.

Since the sliding element 27 is capable of moving along a very short distance, the distance between the end switches 21,22 can be made correspondingly small.

The invention claimed is:

1. A linear actuator (1) comprising: a console (2), an outer tube (3) arranged at least partially within and connected to the console (2), an electric motor (7), a transmission (14), and a spindle (13) connected to the electric motor (7) via the transmission (14), a spindle nut (16) on the spindle (13), an inner tube (4) connected to the spindle nut (16), and where the spindle nut (16) and the inner tube (4) is guided inside the outer tube (3) and moved along the longitudinal axis of the spindle (13) and thereby in or out of the outer tube (3) depending on the direction of rotation of the electric motor (7), and a control box (20) connected to the console (2) by means of a snap connection (35,36), the control box (20) comprising a first and second switch (21, 22) and a switching element (24) having a protrusion (25) protruding out of the control box (20), the switching element being configured to separately activate the first and second switch.

2. The linear actuator according to claim 1, wherein the control box (20) comprises a hook (9), and the console (2) comprises a counterpart (10) to the hook (9), and where the hook (9) and the counterpart (10) to the hook (9) constitute the snap connection.

3. The linear actuator according to claim 2, wherein the hook (9) is resilient.

4. The linear actuator according to claim 2, wherein the counterpart (10) to the hook (9) is an eye in the front end (18) of the console (2).

5. The linear actuator according to claim 1, wherein the snap connection is releasable.

6. A linear actuator (1) comprising:
- a console (2);
- an outer tube (3) arranged at least partially within and connected to the console (2);
- an electric motor (7);
- a transmission (14);
- a spindle (13) connected to the electric motor (7) via the transmission (14);
- a spindle nut (16) located on the spindle (13);
- an inner tube (4) connected to the spindle nut (16), wherein the spindle nut (16) and the inner tube (4) are guided inside the outer tube (3) and moved along the longitudinal axis of the spindle (13) and thereby in or out of the outer tube (3) depending on the direction of rotation of the electric motor (7);
- a sliding element (27) arranged at least partially inside of the outer tube (3) between the spindle nut (16) and the inner tube (4), and wherein the sliding element (27) is activated by the spindle nut (16); and
- a control box (20) connected to the console (2) by means of a snap connection (35,36), the control box (20) comprising a first and second switch (21, 22) and a switching element (24) having a protrusion (25) protruding out of the control box (20).

7. The linear actuator according to claim 6, wherein the sliding element (27) is arranged inside the console (2).

8. The linear actuator according to claim 6, wherein the sliding element (27) is moved by the spindle nut (16) in a predetermined first end section of the stroke length in a first direction and moved in a predetermined second end section of the stroke length in a second direction opposite to the first direction.

9. The linear actuator according to claim 6, wherein the sliding element (27) comprises a pin (31) that protrudes from an opening in the outer tube (3), wherein the pin (31) engages the protrusion (25) of the switching element (24).

10. The linear actuator according to claim 6, wherein the sliding element (27) comprises a pin (31) protruding to an outside of the console (2).

11. The linear actuator according to claim 10, wherein the sliding element (27) comprises an actuation element (28) which is arranged inside the outer tube (3) and a slider (32) is arranged outside of the outer tube (3), and where the pin (31) is arranged on the slider (32), and where the slider (32) is connected to the actuation element (28) through an opening (33) in the outer tube (3).

12. The linear actuator according to claim 6 wherein the sliding element (27) comprises an actuation element (28) comprising a first stop (29) and second stop (30), and where the spindle nut (16) is arranged between the first stop (29) and the second stop (30).

13. The linear actuator according to claim 12, wherein the first stop (29) is arranged on a flexible tongue (34).

14. The linear actuator according to claim 12, wherein the actuation element (28) continues on both sides of the slider (32) inside the outer tube (3).

* * * * *